(12) United States Patent
Hohlfeld et al.

(10) Patent No.: US 7,521,137 B2
(45) Date of Patent: Apr. 21, 2009

(54) PATTERNED THIN FILMS AND USE OF SUCH FILMS AS THERMAL CONTROL LAYERS IN HEAT ASSISTED MAGNETIC RECORDING MEDIA

(75) Inventors: Julius Kurt Hohlfeld, Wexford, PA (US); Yukiko Kubota, Pittsburgh, PA (US); Dieter Klaus Weller, San Jose, CA (US); Stanko Radvan Brankovic, Pittsburgh, PA (US); Xiaomin Yang, Sewickley, PA (US); Earl Chrzaszcz Johns, Sewickley, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 417 days.

(21) Appl. No.: 11/033,936

(22) Filed: Jan. 12, 2005

(65) Prior Publication Data

US 2006/0154110 A1 Jul. 13, 2006

(51) Int. Cl.
*G11B 5/66* (2006.01)
(52) U.S. Cl. ............... 428/831.2; 428/832; 428/826
(58) Field of Classification Search ............ 428/826, 428/831.2, 832
See application file for complete search history.

(56) References Cited

U.S. PATENT DOCUMENTS

| 4,274,935 | A | 6/1981 | Schmelzer et al. | |
|---|---|---|---|---|
| 4,935,278 | A | 6/1990 | Krounbi et al. | |
| 5,353,268 | A | 10/1994 | Hintz | |
| 5,399,372 | A | 3/1995 | Grimes et al. | |
| 5,587,223 | A | 12/1996 | White | |
| 5,820,769 | A | 10/1998 | Chou | |
| 5,956,216 | A | 9/1999 | Chou | |
| 5,981,017 | A | 11/1999 | Agarwal et al. | |
| 6,162,532 | A | 12/2000 | Black et al. | |
| 6,194,048 | B1 | 2/2001 | Hatakeyama et al. | |
| 6,367,924 | B1 | 4/2002 | Sato et al. | |
| 6,392,832 | B1 | 5/2002 | Oshiki et al. | |
| 6,579,590 | B2 | 6/2003 | Ju et al. | |
| 6,579,634 | B2 | 6/2003 | Saito | |
| 6,603,619 | B1 | 8/2003 | Kojima et al. | |
| 6,620,532 | B2 | 9/2003 | Aoyama | |
| 6,636,460 | B2 | 10/2003 | Akiyama et al. | |
| 6,703,099 | B2 | 3/2004 | Belser | |
| 6,754,020 | B1 * | 6/2004 | Hikosaka et al. | 360/59 |
| 6,775,100 | B1 | 8/2004 | Belser et al. | |
| 6,858,319 | B2 | 2/2005 | Yasui et al. | |
| 6,944,101 | B2 * | 9/2005 | Johns et al. | 369/13.13 |
| 7,027,700 | B2 * | 4/2006 | Challener | 385/129 |
| 7,158,346 | B2 * | 1/2007 | Liu et al. | 360/131 |

(Continued)

FOREIGN PATENT DOCUMENTS

EP 0 356 201 A2 2/1990

*Primary Examiner*—Holly Rickman
*Assistant Examiner*—Gary D Harris
(74) *Attorney, Agent, or Firm*—Robert P. Lenart, Esq.; Pietragallo Gordon Alfano Bosick & Raspanti, LLP

(57) ABSTRACT

Patterned thin films comprise regions of relatively low thermal conductivity material separated by regions of relatively high thermal conductivity material. The low thermal conductivity regions may be provided in the form of cylinders or cuboids which are arranged in a continuous matrix of the high thermal conductivity material. The thin film may be used as thermal control layers in data recording media such as heat assisted magnetic recording media.

21 Claims, 5 Drawing Sheets

U.S. PATENT DOCUMENTS

| | | |
|---|---|---|
| 2001/0006436 A1 | 7/2001 | Akiyama et al. |
| 2001/0006744 A1 | 7/2001 | Saito |
| 2001/0016271 A1 | 8/2001 | Aoyama |
| 2001/0017820 A1 | 8/2001 | Akiyama et al. |
| 2002/0022198 A1 | 2/2002 | Bar-Gadda |
| 2002/0034666 A1 | 3/2002 | Kiely |
| 2002/0086185 A1 | 7/2002 | Yasui et al. |
| 2002/0136927 A1 | 9/2002 | Hieda et al. |
| 2002/0168548 A1 | 11/2002 | Sakurai et al. |
| 2004/0062503 A1* | 4/2004 | Challener .................. 385/129 |
| 2004/0240327 A1* | 12/2004 | Sendur et al. ............ 369/13.35 |
| 2005/0041950 A1* | 2/2005 | Rottmayer et al. .......... 385/147 |
| 2005/0193405 A1* | 9/2005 | Hattori et al. ............... 720/659 |
| 2006/0154110 A1* | 7/2006 | Hohlfeld et al. ............. 428/823 |
| 2007/0036040 A1* | 2/2007 | Mihalcea et al. ......... 369/13.14 |

* cited by examiner

PATTERNED THIN FILMS AND USE OF SUCH FILMS AS THERMAL CONTROL LAYERS IN HEAT ASSISTED MAGNETIC RECORDING MEDIA

STATEMENT REGARDING FEDERALLY SPONSORED RESEARCH OR DEVELOPMENT

This invention was made with the United States Government support under Agreement No. 70NANB1H3056 awarded by the National Institute of Standards and Technology (NIST). The United States Government has certain rights in the invention.

FIELD OF THE INVENTION

The present invention relates to patterned thin films and the use of such thin films as thermal control layers in data recording media such as heat assisted magnetic recording media.

BACKGROUND OF THE INVENTION

Magnetic recording in its conventional form has been projected to suffer from superparamagnetic instabilities at high bit densities. As the grain size of the magnetic recording medium is decreased in order to increase the areal density, a threshold known as the superparamagnetic limit at which stable data storage is no longer feasible is reached for a given material and temperature.

Thermal stability of magnetic recording systems can be improved by employing a recording medium formed of a material with a very high magnetic anisotropy. However, very few of such hard magnetic materials exist. Furthermore, with currently available magnetic materials, recording heads are not able to provide a sufficient magnetic writing field to write on such materials.

The current strategy to control media noise for high areal density recording is to reduce the lateral dimensions of the grains. The resulting reduction of the grain volume has to be compensated by a corresponding increase of the magnetic crystalline anisotropy energy density of the media in order to ensure thermal stability of the stored bits throughout a period of at least 10 years. Although the high magnetic crystalline anisotropy of recently developed granular media like $L1_0$ based FePt or CoPt supports areal densities up to several Tbit/inch$^2$, it also hinders conventional writing.

One solution to overcome this dilemma is to soften the medium temporarily by locally heating it to temperatures at which the external write field can reverse the magnetization. This concept, known as heat assisted magnetic recording (HAMR), relies on proper management of the spatial and temporal variations of the heat profile. HAMR involves locally heating a magnetic recording medium to reduce the coercivity of the recording medium in a confined region so that the applied magnetic writing field can more easily direct the magnetization of the recording medium in the heated region during the temporary magnetic softening of the recording medium caused by the heat source. HAMR allows for the use of small grain media, which is desirable for recording at increased areal densities, with a larger magnetic anisotropy at room temperature assuring a sufficient thermal stability.

Lateral heat diffusion in HAMR media is a factor which must be considered when establishing the desired dimensions of the region to be heated. Typical dimensions for Tbit/inch$^2$ recording are 25×25 nm$^2$, assuming a bit-aspect-ratio of one. If the heat delivery system delivers an intensity profile with Gaussian FWHM of 25 nm, then no additional heat spread in the media can be tolerated.

Width and curvature of transitions written via HAMR are governed by the shape of the lateral heat profile. While the transition curvature follows the isothermal line for the chosen write temperature, the transition width is proportional to the temperature gradient in the track direction. Optimal signal-to-noise ratios of the read back signal are obtained for transitions that are straight in the cross track direction. Maximum areal densities are obtained for minimum transition widths that are constant across the track. Hence, rectangular temperature profiles are superior to circular profiles.

Temperature gradients are the driving force for heat diffusion, which in turn leads to reduced temperature gradients. The speed of heat diffusion in a given medium is governed by the thermal diffusivity of the medium. For media with isotropic thermal diffusivity, any initially rectangular temperature profile will quickly be transformed into a circular profile. In contrast, vertical thermal diffusion from a uniformly heated thin film into a patterned heat sink comprising regions of low thermal diffusivity embedded in a matrix of high thermal diffusivity material will lead to local variations of the film temperature that resemble the heat sink pattern.

Other important aspects of HAMR are the efficiency of the heat delivery system and the cooling rate of the media. While the heating has to be sufficient to heat the media to temperatures approximating the Curie point of the media, the cooling rate has to be fast enough to avoid thermal destabilization of the written information during the time the media cools down. Efficiency of the heat delivery system and fast cooling rate are competing factors. Faster cooling rates require more heating power for a certain temperature increase.

A need exists for recording films that can effectively control heat transfer for heat-assisted magnetic recording and other types of systems.

SUMMARY OF THE INVENTION

The present invention provides patterned thin films having regions or phases of relatively low thermal conductivity material and regions or phases of relatively high thermal conductivity material. The thin films are useful as thermal control layers in heat assisted magnetic recording media and the like. In one embodiment, the pattern of low and high thermal conductivity regions of the thin film is coordinated with the recording bit pattern of an adjacent magnetic recording layer, such that heat is conducted away from the recording layer predominantly through the high thermal conductivity regions of the thin film. For example, the low thermal conductivity regions may be located beneath individual recording bits of the recording layer in order to decrease heat transfer from the recording bit regions and increase heat transfer in regions surrounding the bits.

An aspect of the present invention is to provide a thin film comprising regions of low thermal conductivity material extending at least partially through a thickness of the film, and regions of high thermal conductivity material separating the regions of low thermal conductivity material, wherein the regions are structured and arranged to provide greater heat transfer through the thickness of the film in the regions of high thermal conductivity than the regions of low thermal conductivity.

Another aspect of the present invention is to provide a data recording medium comprising a recording layer and a patterned thin film adjacent to the recording layer. The thin film comprises regions of low thermal conductivity material extending at least partially through a thickness of the film, and regions of high thermal conductivity material separating the regions of low thermal conductivity material, wherein the regions are structured and arranged to provide greater heat transfer through the thickness of the film in the regions of high thermal conductivity than the regions of low thermal conductivity.

A further aspect of the present invention is to provide a method of making a patterned thermal control layer. The method comprises forming a layer of removable material comprising a pattern of void regions and filled regions, filling the void regions with a first material having a first thermal conductivity, removing the removable material, and filling the regions previously occupied by the removable material with a second material having a second thermal conductivity different than the first thermal conductivity.

Another aspect of the present invention is to provide a heat assisted magnetic recording system comprising a recording medium and a heat assisted magnetic recording head. The recording medium includes a magnetic recording layer and a patterned thin film adjacent to the magnetic recording layer. The thin film comprises regions of low thermal conductivity material extending at least partially through a thickness of the film, and regions of high thermal conductivity material separating the regions of low thermal conductivity material, wherein the regions are structured and arranged to provide greater heat transfer through the thickness of the film in the regions of high thermal conductivity than the regions of low thermal conductivity. The heat assisted magnetic recording head is positionable adjacent to the recording medium and comprises a write pole for applying a magnetic write field to the recording medium, and a heat source for heating the recording medium proximate to where the write pole applies the magnetic write field to the recording medium.

These and other aspects of the present invention will be more apparent from the following description.

DETAILED DESCRIPTION OF THE INVENTION

The present invention provides patterned thin films which include regions of relatively low thermal conductivity and regions of relatively high thermal conductivity. As used herein, the terms "low thermal conductivity" and "high thermal conductivity" are relative terms which indicate that the thermal conductivity of one material is lower than the thermal conductivity of the other material. For example, the low thermal conductivity region may possess a thermal conductivity that is at least 10 percent lower than the thermal conductivity of the high thermal conductivity material, typically at least 100 percent.

The thin films may be used as thermal control in various applications such as magnetic or other types of data recording media. In one embodiment, the thin film thermal control layer is provided in a heat assisted magnetic recording medium. Although use in heat assisted magnetic recording media is primarily described herein, it is to be understood that the thin film thermal control layers of the present invention may be used in other applications that require laterally confined temperature profiles such as laser material processing and optical recording.

Figure 1:
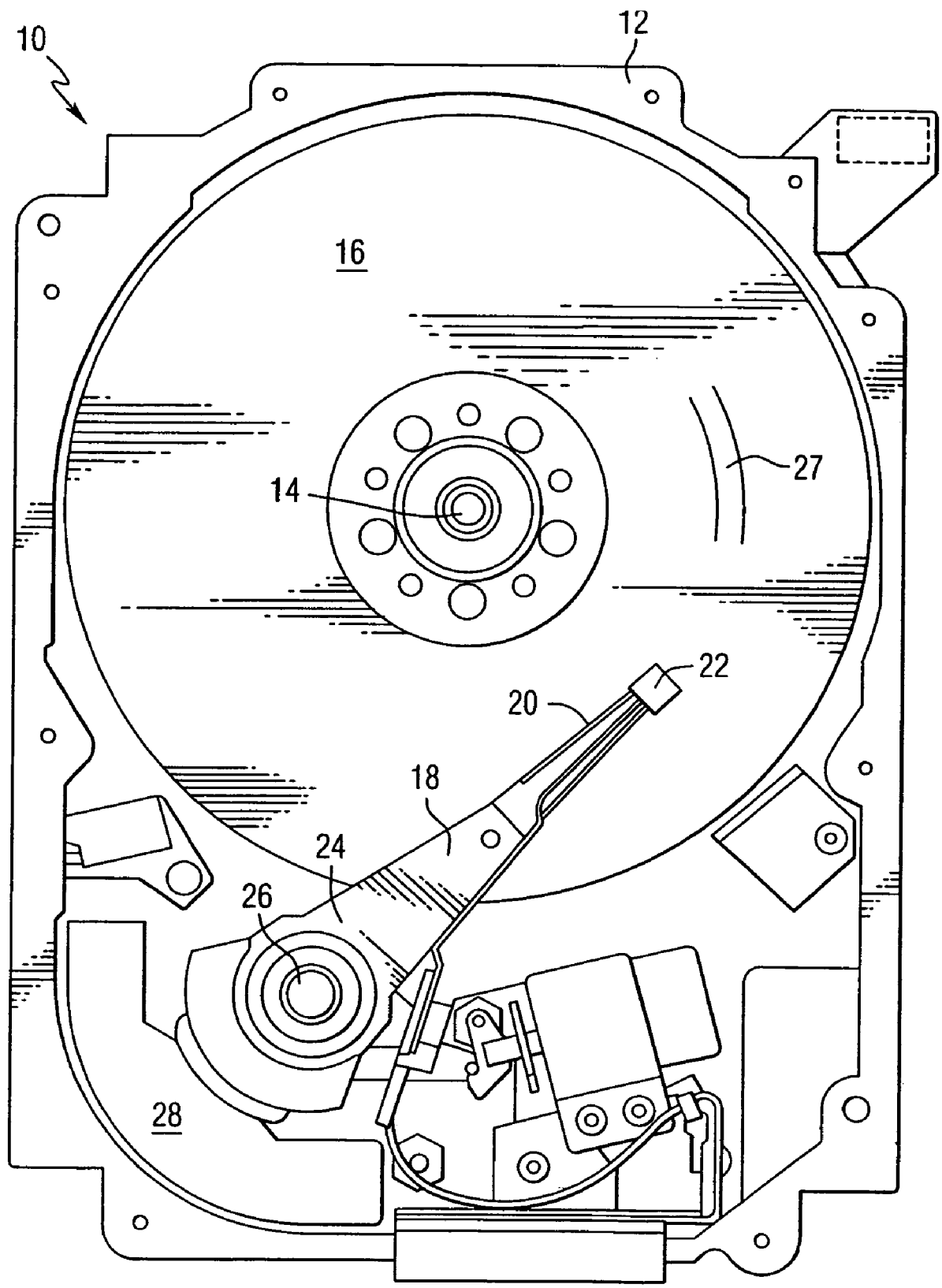
FIG. 1 is a pictorial representation of a disc drive storage system including a heat-assisted magnetic recording head and recording medium having a thin film thermal control layer in accordance with an embodiment of the present invention.

FIG. 1 is a pictorial representation of a disc drive 10 including a heat assisted magnetic recording head. The disc drive 10 includes a housing 12 (with the upper portion removed and the lower portion visible in this view) sized and configured to contain the various components of the disc drive. The disc drive 10 includes a spindle motor 14 for rotating at least one magnetic storage medium 16, which may be a perpendicular magnetic recording medium, within the housing. At least one arm 18 is contained within the housing 12, with each arm 18 having a first end 20 with a recording head or slider 22, and a second end 24 pivotally mounted on a shaft by a bearing 26. An actuator motor 28 is located at the arm's second end 24 for pivoting the arm 18 to position the recording head 22 over a desired sector or track 27 of the disc 16. The actuator motor 28 is regulated by a controller, which is not shown in this view and is well known in the art.

Figure 2:
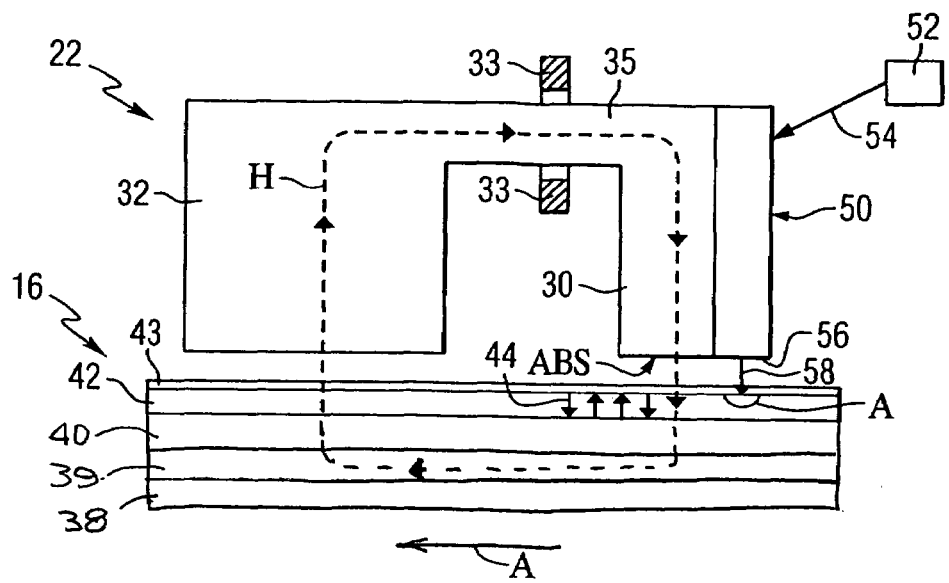
FIG. 2 is a partially schematic illustration of a heat-assisted magnetic recording head and recording medium including a thin film thermal control layer in accordance with an embodiment of the present invention.

FIG. 2 is a partially schematic side view of a HAMR head 22 and a magnetic recording medium 16 which includes a patterned thin film thermal control layer 40 in accordance with an embodiment of the present invention. Although an embodiment of the invention is described herein with reference to the medium 16 as a perpendicular magnetic recording medium, it will be appreciated that aspects of the invention may also be used in conjunction with other type recording heads and/or recording mediums where it may be desirable to employ heat assisted recording.

The HAMR head 22 includes a writer section comprising a main write pole 30 and a return or opposing pole 32 that are magnetically coupled by a yoke or pedestal 35. It will be appreciated that the HAMR head 22 may be constructed with a write pole 30 only and no return pole 32 or yoke 35. A magnetization coil 33 may surround the yoke or pedestal 35 for energizing the HAMR head 22. The HAMR head 22 also may include a read head, not shown, which may be any conventional type read head as is generally known in the art. The recording medium 16 is positioned adjacent to or under the recording head 22 for movement, for example, in the direction of arrow A.

As illustrated in FIG. 2, the recording head 22 also includes structure for HAMR to heat the magnetic recording medium 16 proximate to where the write pole 30 applies the magnetic write field H to the recording medium 16. Specifically, such structure for HAMR may include, for example, a planar optical waveguide schematically represented by reference number 50. The waveguide 50 is in optical communication with a light source 52. The light source 52 may be, for example, a laser diode, or other suitable laser light sources for coupling a light beam 54 into the waveguide 50. Various techniques that are known for coupling light beam 54 into the waveguide 50 may be used in conjunction with the invention, such as, for example, the light source 52 may work in association with an optical fiber and external optics, such as an integrated spherical lens, for collimating the light beam 54 from the optical fiber toward a diffraction grating (not shown). Alternatively, for example, a laser may be mounted on the waveguide 50 and the light beam 54 may be directly coupled into the waveguide 50 without the need for external optical configurations. Once the light beam 54 is coupled into the waveguide 50, the light may propagate through the optical waveguide 50 toward a truncated end 56 of the waveguide 50 that is formed adjacent the air-bearing surface (ABS) of the recording head 22.

As shown in FIG. 2, the heat-assisted magnetic recording medium 16 includes a patterned thin film thermal control layer 40 of the present invention. The recording medium 16 also includes a substrate 38, an optional soft underlayer 39, a magnetic recording layer 42 and a protective overcoat 43. The substrate 38 may be made of any suitable material such as ceramic glass, amorphous glass, aluminum or NiP coated AlMg. The soft underlayer 39 has a typical thickness of from about 50 to about 1,000 nm, and may be made of any suitable material such as CoFe, FeCoB, FeAlN, FeAlSi, NiFe, CoZrNb or FeTaN. The soft underlayer 39 may also comprise laminated structures such as (FeCoB/Ta)·n where n is from 2 to 10, or (FeAlSi/C)·n where n is from 2 to 10. The soft underlayer 39 may further comprise exchange biased structures such as Cu/(IrMn/FeCo)·n where n is from 1 to 5. The magnetic recording layer 42 has a typical thickness of from about 5 to about 30 nm, and may comprise materials having relatively high anisotropies at ambient temperature, such as FePt, FePtNi, CoCrPt, Co/Pt multilayers, and rare earth/transition metal alloys.

A seed layer (not shown) may optionally be provided, e.g., between the soft underlayer 39 and the thermal control layer 40, or between the patterned thin film 40 and the recording layer 42. The seed layer may have has a typical thickness of from about 1 to about 50 nm and may be used to control properties such as orientation and grain size of the subsequently deposited layers. For example, the seed layer may be a face centered cubic material such as Pt which controls the orientation of the subsequently deposited film 42, may be a material such as Ru or Rh which controls grain size and facilitates epitaxial growth of the subsequently deposited layers, or a combination thereof. The seed layer may be made of one or more layers of material such as CoCr, CoCrRu, Ru, Pt, Pd, Rh, Ta, TiC, indium tin oxide (ITO), AlN, TiN or ZnO. In addition to its structural properties, the thermal properties of the seed layer should be compatible with the thermal properties of the magnetic recording layer and the thermal control layer. The protective layer 43 may be made of any suitable material such as diamond-like carbon.

Figure 3:
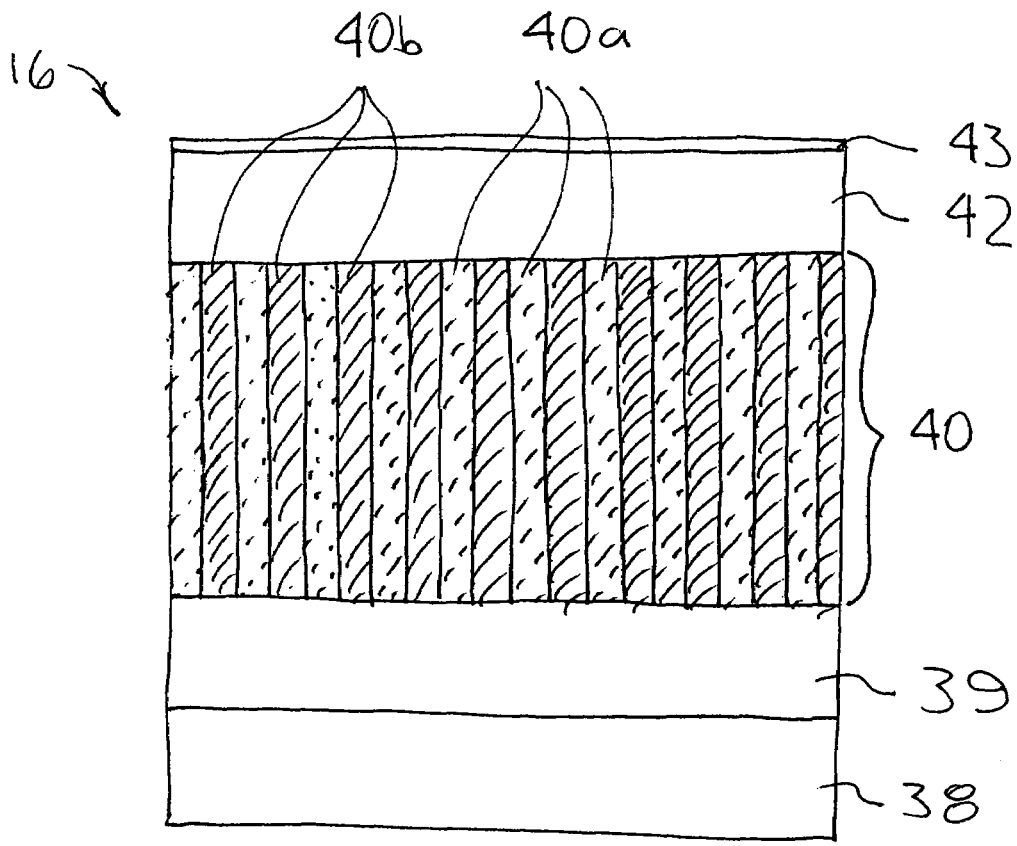
FIG. 3 is an expanded view of the magnetic recording medium 16 shown in FIG. 2, illustrating a thin film thermal control layer including regions of relatively high thermal conductivity and regions of relatively low thermal conductivity in accordance with an embodiment of the present invention.
Figure 4:
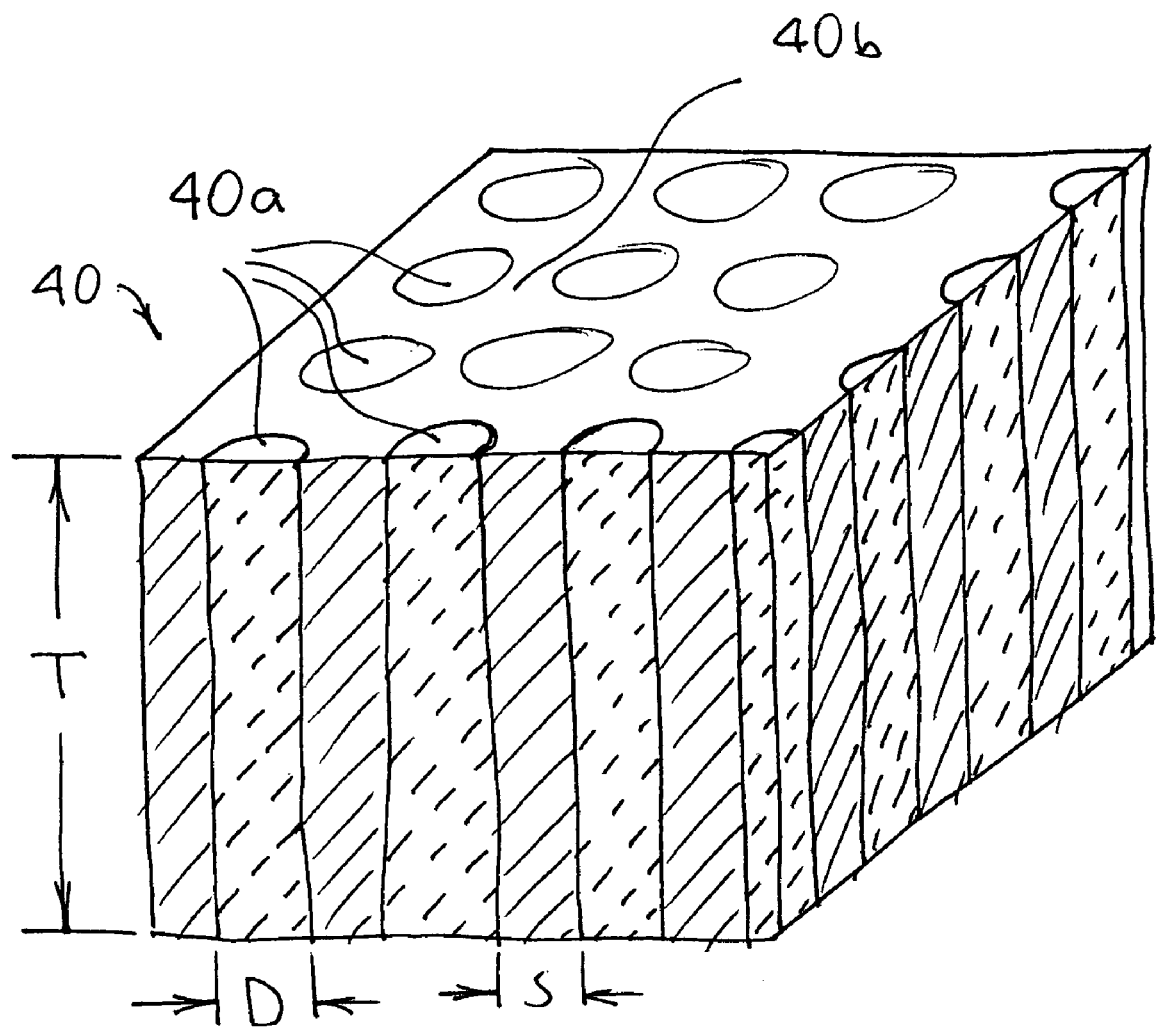
FIG. 4 is an isometric sectional view of the thin film thermal control layer shown in FIG. 3.

FIG. 3 is an expanded view of the magnetic recording medium 16 illustrating details of the patterned thin film thermal control layer 40. FIG. 4 is an isometric sectional view of the thin film thermal control layer 40. The thin film 40 includes regions or phases of relatively low thermal conductivity material 40a and regions or phases of relatively high thermal conductivity material 40b. As shown most clearly in FIG. 4, the low thermal conductivity regions 40a may be provided in the form of cylinders separated by a matrix of the high thermal conductivity material 40b. Each cylindrical region 40a has a diameter D typically ranging from about 2 to about 50 nm, for example, from about 10 to about 25 nm. The spacing S between adjacent thermal insulating cylinders 40a typically ranges from about 2 to about 50 nm, for example, from about 5 to about 25 nm. The thickness T of the thermal control layer 40 typically ranges from about 20 to about 500 nm, for example, from about 100 to about 200 nm.

Although an array of generally cylindrical thermal insulating regions 40a is shown in FIGS. 3 and 4, other shapes and arrangements may be used in accordance with the present invention. For example, instead of circular cross sections, the cylindrical regions 40a may have any other suitable cross section such as square, rectangular, annular and the like, such as cuboids having side wall lengths of from about 5 to about 50 nm. The high thermal conductivity region 40b typically comprises a continuous matrix surrounding discrete regions of the low thermal conductivity material 40a. However, the high thermal conductivity region 40b may alternatively be provided as a discontinuous matrix, e.g., the high thermal conductivity regions may be provided as concentric annular areas separated by concentric annular regions of low thermal conductivity material.

In accordance with the present invention, the low thermal conductivity regions 40a shown in FIGS. 3 and 4 may comprise any suitable material, such as ceramic, glass, or metals of low thermal diffusivity and the like. For example, the regions 40a may comprise oxides, borides, nitrides, carbides. Specific materials of the regions 40a include an oxide selected from $SiO_2$, $ZrO_2$, NiO, $Al_2O_3$, MgO, $Ta_2O_5$ and $TiO_2$; a boride selected from $HfB_2$, and $TaB_2$; a nitride selected from ZrN, TiN, AlN, $Si_3N_4$; and a carbide selected from ZrC, and SiC, a metal selected from Ti, and Sc. For example, the low thermal conductivity regions 40a may typically comprise $SiO_2$, NiO or $Al_2O_3$.

The high thermal conductivity region 40b may comprise any suitable material such as metals, metal alloys or semiconductors. For example, the region 40b may comprise Cu, CuZr, Au, Al, Pt, Cr, Mo, W and/or Si. As particular examples, the high thermal conductivity region 40b may be made of Cu, CuZr or Au.

Table 1 lists some of the materials options in conjunction with the present invention, listed in order from low thermal conductivity to high thermal conductivity materials. While oxides such as $SiO_2$, $ZrO_2$ and $TiO_2$ tend to act as efficient thermal barriers, metals such as Cu, Ag, Au and Al or alloys such as CuZr are good choices for the high thermal conductivity or heat sink materials.

TABLE 1

Thermal Conductivity (cal/sec/K/cm) of Various Materials

| Material | 20° C. | 100° C. | 400° C. |
|---|---|---|---|
| Fused silica ($SiO_2$) | 0.004 | 0.004 | 0.0048 |
| Stabilized $ZrO_2$ (e.g. YSZ) | 0.0045 | 0.0047 | 0.005 |
| $TiO_2$ | 0.015 | | 0.01 |
| $HfB_2$ | 0.015 | | |
| $TaB_2$ | 0.026 | | |
| ZrN | | | .025 (@425° C.) |
| Ta | 0.036 | | |
| Ti | 0.0411 | | |
| ZrC | 0.049 | | |
| NiO | 0.05 | | 0.015 |
| Ru | 0.057 | | |

TABLE 1-continued

Thermal Conductivity (cal/sec/K/cm) of Various Materials

| Material | 20° C. | 100° C. | 400° C. |
|---|---|---|---|
| TiN | 0.069 | | |
| AlN | 0.072 | | 0.053 |
| $Si_3N_4$ | 0.072 | | |
| $Al_2O_3$ | 0.08 | 0.072 | 0.035 |
| MgO | 0.097 | 0.08 | 0.04 |
| Cr | 0.16 | | |
| Co | 0.165 | | |
| Pt | 0.17 | | |
| Al | 0.503 | | |
| Au | 0.71 | | |
| Cu | 0.934 | | |

Figure 5:
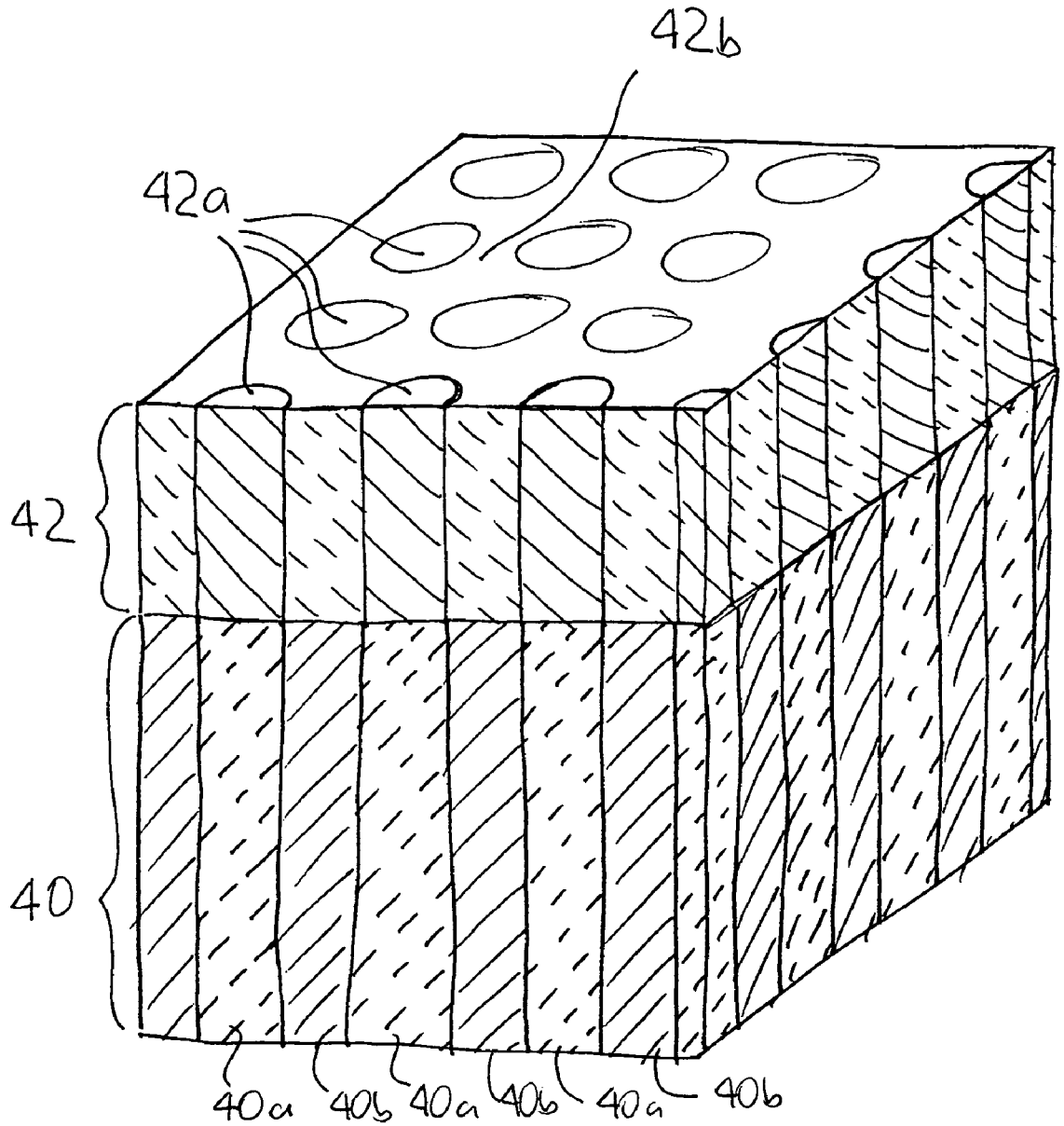
FIG. 5 is an isometric sectional view illustrating a magnetic recording layer deposited on a thin film thermal control layer in accordance with an embodiment of the present invention.

FIG. 5 illustrates a patterned thin film thermal control layer 40 similar to that shown in FIG. 4 with a recording layer 42 deposited thereon in accordance with an embodiment of the present invention. The recording layer 42 includes a bit pattern of recording regions 42a separated by spacer regions 42b. Typical materials for the recording regions 42a include FePt, FePtNi, CoCrPt, Co/Pt multilayers and/or rare earth/transition metal alloys. Suitable materials for the spacer region 42b include NiO, $SiO_2$, and/or Cr.

In the embodiment shown in FIG. 5, the recording regions 42a are provided in the form of cylinders substantially aligned with the underlying low thermal conductivity regions 40a. The cylindrical recording regions 42a may be aligned along individual recording tracks of the recording medium. However, any other suitable alignment or shape may be used. For example, instead of circular cross sections, the recording regions 42a may have square, rectangular or annular cross sections. By aligning the low thermal conductivity regions 40a with the recording regions or bits 42a, heating of the recording layer 42 results in selective heat transfer from the recording layer 42 such that each recording region 42a has a lower rate of heat transfer than its surrounding region. The present thermal control layers may be combined with patterned magnetic recording layers, for example, as described in U.S. patent application Ser. No. 10/447,602, which is incorporated herein by reference.

In the embodiment shown in FIGS. 2-5, the thin film thermal control layer comprises a pattern of pillars 40a made of thermally insulating material embedded in a matrix of a good thermal conductor 40b. When a magnetic recording layer 42 is deposited on the thermal control layer 40 as shown in FIG. 5, the resulting variation of perpendicular heat transport during HAMR operations leads to a related variation in the maximum temperature and the vertical temperature gradients notwithstanding whether the magnetic recording layer is granular or continuous. A large temperature rise occurs above the pillars 40a, and a small increase occurs above the interspaces 40b. The bit pattern of the recording layer 42 may be predefined by the pattern of the heat sink regions, and the heating power may be adjusted such that the maximum temperature rise in the magnetic layer on top of the good conducting interspaces/poor conducting pillars is well below or well above the writing temperature. The fact that the lateral temperature modulation is mainly governed by the heat sink pattern relaxes the high demands on the lateral confinement of the heat source.

The thermal control layers of the present invention may be made by any suitable processing technique, such as conventional lithography, diblock copolymer lithography, electrodeposition of metals into porous zeolite films, reative ion etching using block copolymer templates, replication and the like.

One method is to physically pattern the heat sink layer using conventional lithography. Resist patterning followed by reactive ion etching creates channels, which are then backfilled with a highly conducting metal, such as Cu, Ag, Au or Al, followed by planarization. However, the limits of lithographic resolution may restrict this approach, e.g., resolutions of approximately 20 nm may be achieved using electron beam lithography and PMMA resist material.

In another embodiment, diblock copolymers may be used to achieve the desired lithographic resolution. For example, a PMMA/polystyrene diblock copolymer may be used. The process involves lithographic formation of a self-assembled diblock copolymer film, UV exposure, and removal of one of the block materials. In one embodiment, the cylinder phase may be removed and backfilled with a more rigid nonconductive material. In another embodiment, the surrounding matrix phase may be removed and a good thermally conductive material may be electrodeposited in the removed region, followed by removing and filling in the cylinder regions with a low thermal conductivity material. The final structure is then planarized, e.g., with CMP. Using this approach with diblock copolymers, the diameters of the columns may be as small as 10 or 5 nm.

An alternative route to active patterning and etching is to use nanoporous or mesoporous materials, such as zeolites, in which the holes/channels are backfilled with a highly conducting metal. Metallic nanowires may be formed in the oriented zeolite films. Examples of suitable zeolite materials are listed in Table 2. Block co-polymers may be used as templates for reactive ion etching to form metallic nanowires. Porous b-oriented MFI films may also be used in conjunction with the present invention.

TABLE 2

Zeolite Materials

| Zeolite | Ring Size | Pore Size (Å) | Composition | Pore Dimension |
|---|---|---|---|---|
| VFI | 18 | 12.7 × 12.7 | $[Al_{18}P_{18}O_{72}]$ | 1 |
| CFI | 14 | 7.2 × 7.5 | $[Si_{32}O_{64}]$ | 1 |
| AET | 14 | 7.9 × 8.7 | $[Al_{36}P_{36}O_{144}]$ | 1 |
| IFR | 12 | 6.2 × 7.2 | $[Si_{32}O_{64}]$ | 1 |
| AFI | 12 | 7.3 × 7.3 | $[Al_{12}P_{12}O_{48}]$ | 1 |
| STF | 10 | 5.4 × 5.7 | $[Si_{16}O_{32}]$ | 1 |
| MFI | 10 | 5.3 × 5.6 | $[Si_{96}O_{192}]$ | 3 |

Figure 6:
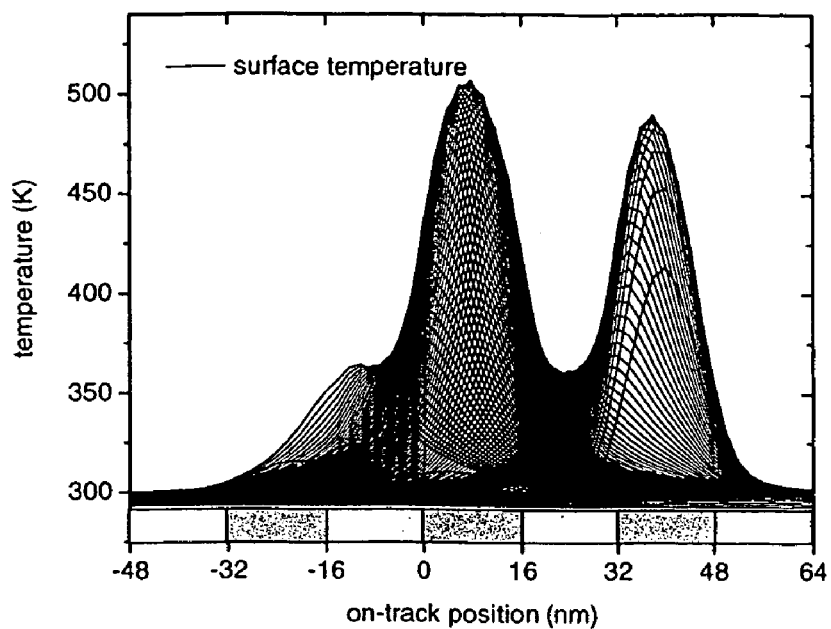
FIG. 6 is a spatial thermal profile in which temperature is plotted versus position along the track of a heat assisted magnetic recording medium including a thin film thermal control layer in accordance with an embodiment of the present invention.
Figure 7:
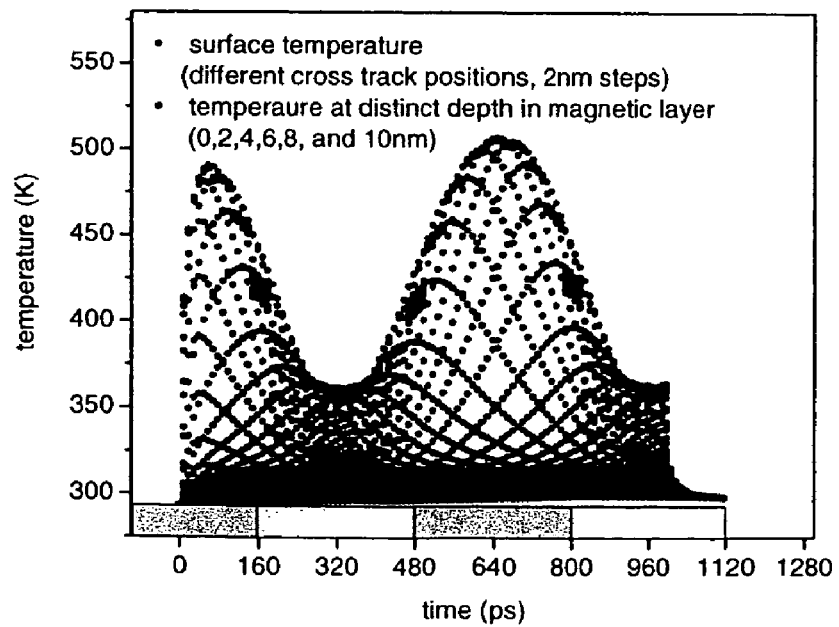
FIG. 7 is a temporal thermal profile in which temperature is plotted versus time for a heat assisted magnetic recording medium including a thin film thermal control layer in accordance with an embodiment of the present invention.

Results of numerical simulations on the expected spatial and temporal temperature variations are shown in FIGS. 6 and 7 respectively. The results are obtained by a finite-difference-time-domain code using 2 nm and ifs spatial and temporal steps and the following input parameters. A 10 nm FWHM Gaussian heat source of 330 mW/$\mu m^2$ power is instantaneously switched on at t=0. At this time it is located at 40 nm and subsequently moving with constant speed of 50 m/s towards negative values. The magnetic recording layer is 10 nm thick, has a heat capacity of 3.73e6 J/$m^3$K, and a vertical thermal conductivity of 99.2 W/mK. The lateral thermal conductivity of this layer is set a hundred times smaller to 0.992 W/mK in order to account for the granular nature of this layer. The thickness of the thermal control layer is 100 nm. The high conductivity matrix of the thermal control layer is assumed to be gold and its heat capacity and thermal conductivity are set to 2.49e6 J/$m^3$K and 317 W/mK, respectively. The poorly conducting parts of the heat sink are assumed to be cuboids with dimensions 16×32 nm along and across the track direction, respectively. Whereas the heat capacity of these parts is set identically to the value of gold, their thermal conductivity is set to 0.992 W/mK, i.e., as low as the lateral heat conductivity in the magnetic recording layer. No other layer is considered in the calculations, and it is assumed that there is neither any heat transport from the magnetic recording layer to the air, nor from the thermal control layer to the substrate.

FIG. 6 is a spatial profile in the on-track direction of the surface temperature for various times in increments of 50 ps. These profiles demonstrate the dependence of the maximum temperature on the heat sink pattern comprising relatively high thermal conductivity regions 40b and relatively low thermal conductivity regions 40a.

FIG. 7 illustrates the variation of temperature for various cross track positions at the surface and various depths below the center of a heat source versus time, demonstrating that the heat sink pattern not only governs the maximum temperature at the surface but also the vertical temperature gradient.

Whereas particular embodiments of this invention have been described above for purposes of illustration, it will be evident to those skilled in the art that numerous variations of the details of the present invention may be made without departing from the invention as defined in the appended claims.

What is claimed is:

1. A data recording medium comprising:
    a data recording layer including a plurality of recording regions; and
    a patterned thin film adjacent to the data recording layer, wherein the thin film comprises:
        regions of low thermal conductivity material extending at least partially through a thickness of the film; and
        regions of high thermal conductivity material separating the regions of low thermal conductivity material, wherein the regions of high thermal conductivity material and the regions of low thermal conductivity material are structured and arranged to provide greater heat transfer through the thickness of the film in the regions of high thermal conductivity than the regions of low thermal conductivity, and the regions of low thermal conductivity are positioned beneath the recording regions of the data recording layer, wherein the recording layer comprises a magnetic bit pattern and the low thermal conductivity regions are arranged in a pattern corresponding to the magnetic bit pattern of the recording layer.

2. The data recording medium of claim 1, wherein the low thermal conductivity regions are substantially cylindrical.

3. The data recording medium of claim 1, wherein the low thermal conductivity regions are substantially cuboids.

4. The data recording medium of claim 1, wherein the low thermal conductivity regions have a thermal conductivity of less than 0.1 cal/sec/K/cm, and the high thermal conductivity regions have a thermal conductivity of greater than 0.1 cal/sec/K/cm.

5. The data recording medium of claim 1, wherein each low thermal conductivity region corresponds to a single bit of the recording layer.

6. The data recording medium of claim 1, wherein the recording medium is heat assisted recording medium.

7. A heat assisted magnetic recording system comprising:
    a recording medium including a magnetic recording layer having a plurality of recording regions and a patterned thin film adjacent to the magnetic recording layer, wherein the thin film comprises:
        regions of low thermal conductivity material extending at least partially through a thickness of the film; and
        regions of high thermal conductivity material separating the regions of low thermal conductivity material, wherein the regions of high thermal conductivity material and the regions of low thermal conductivity material are structured and arranged to provide greater heat transfer through the thickness of the film in the regions of high thermal conductivity than the regions of low thermal conductivity, and the regions of low thermal conductivity are positioned beneath the recording regions of the magnetic recording layer, wherein a pattern of the low thermal conductivity regions corresponds to a bit pattern of the magnetic recording layer; and
    a heat assisted magnetic recording head positionable adjacent to the recording medium, the heat assisted magnetic recording head comprising a write pole for applying a magnetic write field to the recording medium, and a heat source for heating the recording medium proximate to where the write pole applies the magnetic write field to the recording medium.

8. The heat assisted magnetic recording system of claim 7, wherein the low thermal conductivity regions are substantially cylindrical.

9. The heat assisted magnetic recording system of claim 8, wherein the substantially cylindrical low thermal conductivity regions have cross-sectional diameters of from about 2 to about 50 nm.

10. The heat assisted magnetic recording system of claim 8, wherein the low thermal conductivity regions comprise substantially rectangular cross sections.

11. The heat assisted magnetic recording system of claim 10, wherein the substantially rectangular cross sections have side lengths of from about 5 to about 50 nm.

12. The heat assisted magnetic recording system of claim 7, wherein the low thermal conductivity regions are spaced apart from each other a distance of from about 2 to about 50 nm.

13. The heat assisted magnetic recording system of claim 7, wherein the low thermal conductivity regions comprise an oxide, boride, carbide and/or nitride.

14. The heat assisted magnetic recording system of claim 7, wherein the low thermal conductivity regions comprises $SiO_2$, $ZrO_2$, NiO, $Al_2O_3$, MgO, $Ta_2O_5$, $TiO_2$, $HfB_2$, $TaB_2$, ZrN, TiN, AlN, $Si_3N_4$, ZrC and/or SiC.

15. The heat assisted magnetic recording system of claim 7, wherein the low thermal conductivity regions have a thermal conductivity of less than 0.1 cal/sec/K/cm.

16. The heat assisted magnetic recording system of claim 7, wherein the high thermal conductivity regions comprise a continuous matrix.

17. The heat assisted magnetic recording system of claim 7, wherein the high thermal conductivity regions comprise a metal or metal alloy.

18. The heat assisted magnetic recording system of claim 7, wherein the high thermal conductivity regions comprise Cu, CuZr, Au, Ag, Al, Pt, Cr, Mo, W or alloys thereof.

19. The heat assisted magnetic recording system of claim 7, wherein the high thermal conductivity regions have a thermal conductivity of greater than 0.1 cal/sec/K/cm.

20. The heat assisted magnetic recording system of claim 7, wherein the thin film has a thickness of less than about 500 nm.

21. The heat assisted magnetic recording system of claim 7, wherein each low thermal conductivity region corresponds to a single bit of the magnetic recording layer.

* * * * *

UNITED STATES PATENT AND TRADEMARK OFFICE
CERTIFICATE OF CORRECTION

PATENT NO. : 7,521,137 B2  Page 1 of 1
APPLICATION NO. : 11/033936
DATED : April 21, 2009
INVENTOR(S) : Julius Kurt Hohlfeld et al.

It is certified that error appears in the above-identified patent and that said Letters Patent is hereby corrected as shown below:

Detailed Description of the Invention

Column 8, Line 49
"...time-domain code using 2 nm and ifs spatial and temporal..."
Should read
"...time-domain code using 2 nm and 1fs spatial and temporal..."

Signed and Sealed this

Fifth Day of January, 2010

David J. Kappos
*Director of the United States Patent and Trademark Office*